US006139219A

United States Patent [19]
Vinarsky

[11] Patent Number: 6,139,219
[45] Date of Patent: Oct. 31, 2000

[54] DOCKING/SUPPORT SYSTEM FOR PERSONAL WATER CRAFTS

[76] Inventor: Michael A. Vinarsky, 728 Red Barn La., Elgin, Ill. 60123

[21] Appl. No.: 09/054,016

[22] Filed: Apr. 2, 1998

[51] Int. Cl.[7] .............................. B63C 5/02; F16M 11/22
[52] U.S. Cl. .............................. 405/7; 248/129; 248/150; 248/165
[58] Field of Search .................................. 405/4, 7, 218; 114/44; 414/678; 248/129, 150, 165, 676, 678

[56] References Cited

U.S. PATENT DOCUMENTS

| | | | |
|---|---|---|---|
| 1,453,666 | 5/1923 | Franovich | 405/7 X |
| 3,362,172 | 1/1968 | Rutter | 405/3 |
| 4,468,150 | 8/1984 | Price | 405/7 |
| 4,609,183 | 9/1986 | Ulmer | 256/1 |
| 4,773,346 | 9/1988 | Blanding et al. | 405/4 X |
| 5,016,893 | 5/1991 | Hart, Jr. | 248/129 X |
| 5,449,247 | 9/1995 | Smith | 405/7 X |
| 5,857,664 | 1/1999 | Schauman | 256/1 X |
| 5,862,921 | 1/1999 | Venegas, Jr. | 256/1 |

*Primary Examiner*—Eileen D. Lillis
*Assistant Examiner*—Tara L. Mayo
*Attorney, Agent, or Firm*—Charles F. Lind

[57] ABSTRACT

The disclosed portable docking/support system has a frame structure including end stands and elongated members connected at opposite ends thereof to and between the end stands. The elongated members include a pair of upper members and a lower member spaced below and laterally between the upper members for strengthening the frame structure. The upper elongated members are laterally spaced apart a distance less than the hull width of a personal water craft to be docked relative to the system and are extended lengthwise at least a portion of the hull length. The end stands have optional structures (casters, wheels or end plugs) suited to be rolled on or rested on a generally horizontal support surface (under water on a lake or river bed or on a nearby beach or land). The upper elongated members are spaced apart horizontally and are vertically higher than the end stands at all locations laterally between the upper elongated members. In use, with the end stand structures rested on a river or lake bed support surface, the upper elongated members will be proximate but generally below the water surface, operable to allow a water craft to be substantially floated lengthwise between and onto the upper elongated members and into a supported or docked association therewith. The frame structure is formed of lightweight plastic piping for allowing it to be manually moved about as needed and for durability in and out of water.

11 Claims, 2 Drawing Sheets

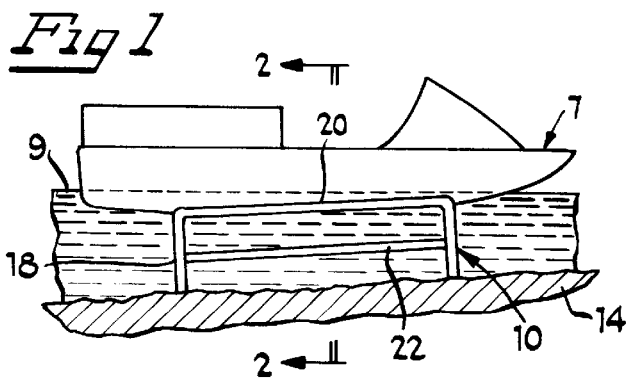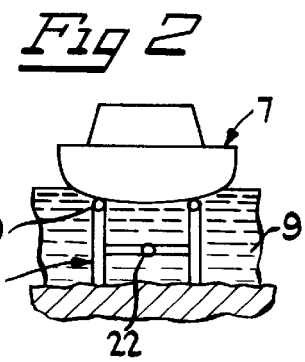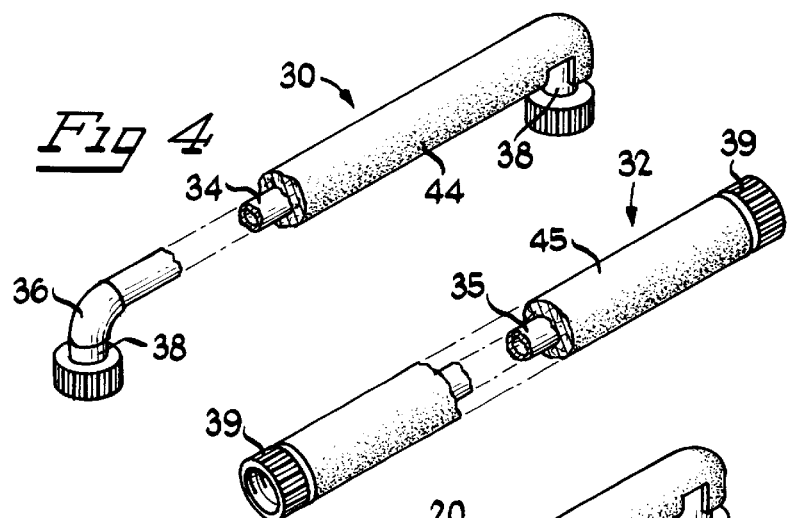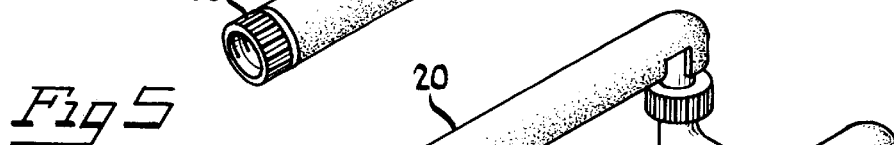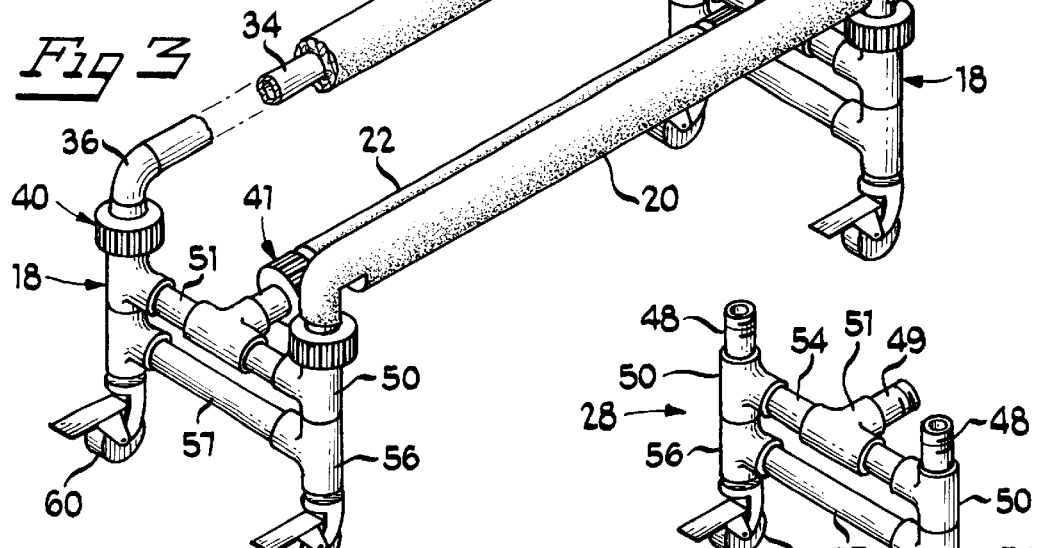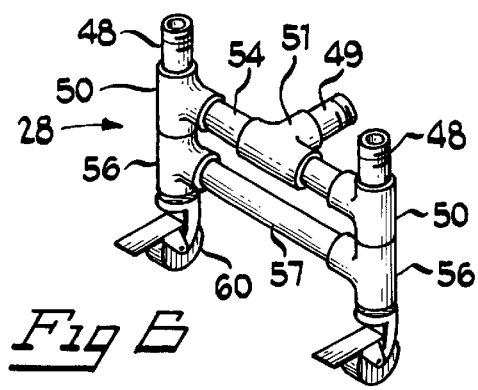

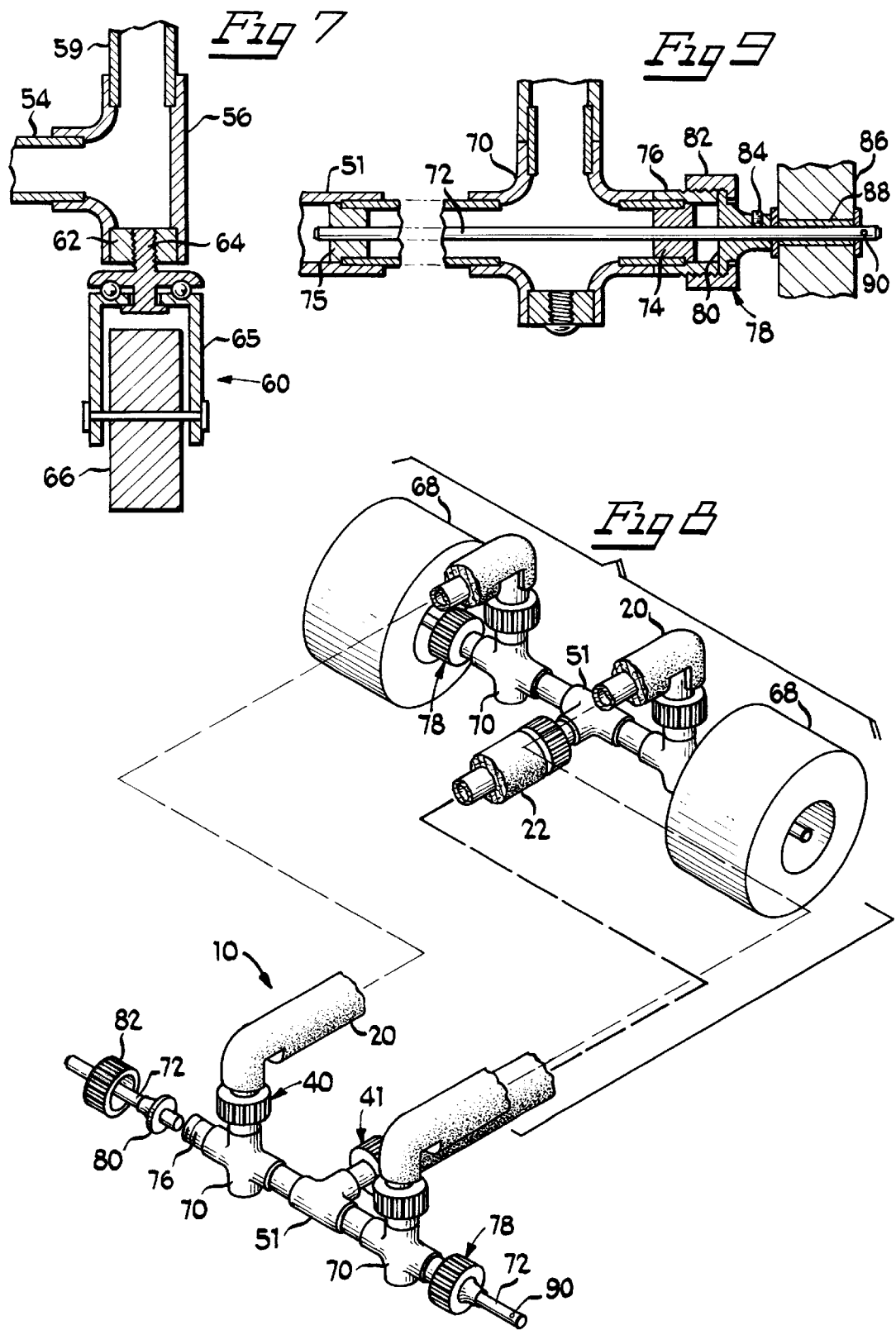

DOCKING/SUPPORT SYSTEM FOR PERSONAL WATER CRAFTS

BACKGROUND OF THE INVENTION

Personal water crafts, or small floating vessels each capable of holding only several passengers at a time, have recently become highly used and enjoyed by millions of water-sports lovers. Their appeal includes high power and available high operating speeds; reasonable safety, being powered by high velocity water jets (not exposed rotating propellers); and being small enough to be towed on a smallish trailer and ramp launched quite easily. Nonetheless, personal water crafts might weigh in excess of several hundred pounds, and could approach six/seven hundred pounds.

This craft weight can limit the options available for temporary non-use docking in shallow water near the shore, such as being dragged out of the water and onto a sandy beach. Manually dragging the craft onto the beach not only might be difficult, particularly by only one person, but moreover the weighted contact against underlying rocks, sand, etc. can dent, scratch or otherwise damage the craft hull. Bow anchoring the floating craft off the shore can allow stern drift, potentially onto or against the shore or into a collision against a like-anchored adjacent craft, particular during windy or wavy conditions. Further, where ramp launching of the craft off of the vehicle-hitched craft road trailer is unavailable, one might attempt to unhitch the road trailer and roll it over land between a parking lot and a beach edge, but the combined trailer/craft weights and thin profile road tires might make this effort difficult if not impossible.

SUMMARY OF THE INVENTION

This invention relates to apparatus forming a system for carrying, transporting, docking or supporting personal water craft, on or over land and/or in shallow water.

A basic object of this invention is to provide a lightweight portable apparatus that can accomplish the above functions while yet being inexpensive to make and/or assemble and disassemble for readying the apparatus for different modes of use.

Another object of this invention is to provide multiple component subassembly apparatus that as subassemblies when unassembled will be compact for storage, etc., and when assemblied will define a lightweight structure suited to be manually positioned in shallow water while having partly submerged docking or cradle supports thereon, allowing the craft to be easily and stably positioned thereon for docking near the shore or beach edge while yet being spaced from the roughness of the river/lake bed.

Another more detailed object of this invention is to provide such multiple component subassembly apparatus that can be easily assembled and disassembled according to different end configurations, suited to modify the above-mentioned docking structure with the addition thereon of all-terrain wheels for providing a cart that can be easily and manually rolled even while carrying the craft thereon on or over land, even sandy terrain, and into the water for launching the craft off of a beach and/or for ramp-loading the craft onto a flat-bed of a road trailer, carriage truck or the like.

BRIEF DESCRIPTION OF THE DRAWINGS

These and other objects, features or advantages of the invention will be more fully understood and appreciated after considering the following description of the invention, which includes as a part thereof the accompanying drawings, wherein:

FIG. 1 is a side elevational view of the frame structure of the inventive docking/support system shown in docking association with a water craft, yet partially floated in water;

FIG. 2 is a sectional view taken generally from line 2—2 in FIG. 1;

FIG. 3 is a perspective view, partly broken away for clarity of disclosure, of the frame structure in one embodiment of the inventive docking/support system;

FIGS. 4, 5 and 6 are perspective views of basis subassemblies used to form the frame structure of FIG. 3;

FIG. 7 is a sectional view of a caster and its support relative to the lower end of each end section;

FIG. 8 is an exploded perspective view, partly broken away for clarity of disclosure, of the frame structure in a second embodiment of the inventive docking/support system; and FIG. 9 is a sectional view of a typical all-terrain wheel and shaft support relative to the lower end of each end section.

DETAILED DESCRIPTION OF PREFERRED EMBODIMENTS OF THE INVENTION

One embodiment of the inventive docking/support system is illustrated in FIGS. 1 and 2 in a typical docking arrangement of a personal water craft 7 in water 9, where portable frame structure 10 is rested on and supported by the generally horizontal lake or river bed 14, and where the water craft is stably supported on the frame structure, but possibly yet partially in or touching and/or floated by the water. The frame structure 10 is positioned in the water at the needed water depth, or distance from the water's edge or shore, for locating craft support members 20 at the proper height in the water to achieve the above mentioned craft supporting relationship. In this regard, the frame structure 10 will have a height slightly in excess of the draft of the water craft, to allow the craft to be floated up and onto to the frame structure without bottoming against the lake/river bed 14. The water craft 7 with the operator carried thereon can be driven onto the frame support members 20 under its power or generated movement through the water and/or by the operator manually manipulating the water craft while standing in the water.

The frame structure 10 is illustrated in greater detail in FIG. 3, and includes end stands 18 spaced apart in the longitudinal direction of the water craft 7 and elongated members 20, 22 connected between the end stands 18 and extended in the longitudinal direction of the water craft. The elongated members 20, 22 are triangularly arranged for strengthening the frame structure, with the upper members 20 being horizontally aligned and laterally spaced apart a distance less than the hull width of the water craft 7 and with the lower member 22 being spaced below and approximately centered between the upper members 20. The elongated members 20, 22 might be extended only a portion of the hull length, the upper members 20 thus being suited to underlie and support the underside of a craft hull when the water craft is positioned thereon.

By way of example, to work with most models of currently available and popular personal water craft, the longitudinal support members 20 might be laterally spaced apart between 15–25 inches, their height without special extensions above the supporting bed 14 might be between 10–30 inches, and their lengths might be between 40–60 inches.

The frame structure 10 might preferably be made of strong lightweight material, such as schedule 80 plastic piping (PVC) components. As such, noted frame structure 10 might have a total weight of possibly between 25–50 pounds, making it light enough to have most water craft operators manually lift and carry it a short distance across land and in shallow water, such as between a nearby parking lot and the illustrated position in shallow water. Nonetheless, a PVC component frame structure 10 can be sufficiently strong to support its carried water craft, both within or out of the water; and moreover will be immune from rot or rust damage due to exposure to the water. The PVC frame structure components can be telescoped together and held permanently secured together by an appropriate adhesive, providing a unitary frame structure similar to that illustrated except not being collapsible, making it large and bulky for nonuse storage or the like.

Of further importance, the PVC components can be permanently secured together to form separate subassemblies, such as 28, 30, 32 illustrated in FIGS. 4, 5 and 6 respectively. The individual subassemblies will be compact for initial shipment and/or nonuse storage, but can be and when assemblied together would provide the much larger illustrated frame structure 10 of FIGS. 1, 2, 3. Specifically, each end stand 18 and each longitudinal member 20, 22 might be formed as subassemblies 28, 30, 32 respectively.

Each subassembly 30 might include a one piece pipe 34 with a right-angle elbow 36 bonded permanently in place on each pipe end, and one component (the female component 38) of a separable union 40 might be bonded permanently in place via a pipe or nipple (not shown) relative to the elbow 36. Each subassembly 32 might include the single piece pipe 35 with a like female component 39 of a separable union 41 bonded permanently in place relative to each end of the pipe 35. The subassemblies 30 for sure, and possibly also the subassembly 32, further might be covered (even over the end elbows 36) with a durable high density foam 44, 45 to provide both cushioning support of the craft hull relative to the frame structure 10 and easier damage-free sliding of the wet craft hull onto and off of the foamed support.

Each subassembly 28 might include threaded male components 48, 49 of the separable unions 40, 41 supported in alignment for establishing the separable connection with the female components 38, 39 thereof. To provide this, each of the threaded male components 48, 49 might be bonded permanently in place via a pipe or nipple (not shown) relative to respective tees 50, 51, and the tees 50, 51 might be bonded permanently together relative to one another via pipes 54.

The illustrated embodiment of FIGS. 3, 6 shows, but the invention commonly might not need, additional height that would be generated in the end stand 18 and/or subassemblies 28 by utilizing a second set of tees 56 that can be press-fit onto or bonded permanently to the tees 50 via extension pipes or nipples (59 being shown in FIG. 7), and the tees 56 might be bonded permanently together relative to one another via pipe 57. A preferred orientation would have the separate tees 50, 56 and any extension pipes therebetween aligned normal to the longitudinal members 20, 22 and generally vertically for yielding high load carrying ability.

As illustrated also in the embodiment of FIGS. 3, 6, 7, casters 60 can be mounted at the lower end openings of the tees 56 (or tees 50 should no height extension being needed or used), allowing rolling mobility of the frame structure 10 on smooth flat surfaces, such as a concrete floors or the like for supporting the craft when such is out of the water, during nonuse storage periods or the like. To make a suitable caster connection, a tapped insert 62 can be permanently bonded in place in the lower end opening of each lower tee and the stationary shank 64 of the caster can be threaded into the insert tap, with conventional bearings allowing the caster wheel fork 65 to swivel and the wheel 66 to rotate relative to the fork and stationary frame structure. Of further interest, the mobile caster supported frame structure has proven useful for displaying and exhibiting water craft carried thereon, such as at trade shows or on a retail sales outlet show room floor. By using connection nipples/pipes between the elbows 36 and the union components 38 of different lengths, the support members 20 can be oriented at different elevations, to support the water craft at an inclination other than horizontal, for added visual appeal.

Alternatively, when the frame structure 10 is to be used in water and the casters 60 should be kept clean, they should be unthreaded from the frame insert tap, and end plugs can be threaded into the inserts to keep the tap threads separated from sand or like abrading substance that could damage the threads.

Of added importance to the invention and its versatility, the frame structure 10 illustrated in FIGS. 8, 9 is designed to have four all-terrain or wide-thread wheels 68 mounted thereon suited to convert the frame structure to a cart that can be easily rolled over land, even sandy beaches, and into the water off of a beach, for carrying the water craft thereon over land and launching it into the water. To make the cart embodiment, the tees 50 are replaced by cross components 70 to have outwardly directed openings for receipt of separate wheel axles 72. Bored inserts 74, 75 can be permanently bonded in place in the threaded male components 76 of the unions 78, and in the center tee 51, operable with the wide separation therebetween for stably and laterally supporting each axle 72. Further, an annular thrust plate 80 can be fitted over each axle and held between the cooperative components 76, 82 of the union 78, and a set screw 84 threaded in the thrust plate can be tightened against the axle 72 to limit both axial and rotational axle movements relative to the thrust plate. Hub structure 86 including a nylon sleeve bearing 88 on each wheel 68 can be trapped rotatably on the axle, between the thrust plate 80 and pin means (not shown) removably fitted into opening 90 in the axle.

The wheel 68 and the mounting axle 72 can be easily assemblied onto or removed from the frame structure by means of the separable union components 76, 82, and locking set screw 84, and/or the wheel can be easily removed from the axle 72 by removing the pin means from the axle opening 90. When the wheels 68 are connected on the frame structure 10, the frame structure will be sufficiently elevated above the underlying support surface to have any casters 60 connected on the frame structure spaced above the support surface.

It can thus be appreciated that the disclosed apparatus is lightweight, portable, and durable in use, and can be economically made into its major subassemblies 28, 30, 32, and then assemble or disassenble different casters 60, wheels 68, or plugs 72 for readying or converting the apparatus into any of several different uses. Thus, the separated and/or indivindual subassemblies can be stacked quite compactly for nonuse storage, etc., compared to the size of the assemblied subassemblies when forming the frame structure 10 and/or mobile cart. The inventive apparatus forms a viable system for carrying, transporting or supporting personal water craft on or over hard or soft land surfaces and/or in shallow water, and in docking and supporting personal water craft while in shallow water.

While specific embodiments have been illustrated, it will be obvious that minor changes could be made therefrom without departing from the spirit of the invention. Accordingly, the invention is to determined by the scope of the following claims.

What is claimed is:

1. A portable docking/support system for personal water crafts, the system comprising, a frame structure including end stands and elongated members connected at opposite ends thereof to the end stands;

said elongated members including a pair of upper members and a lower member spaced below the upper members for strengthening the frame structure each of said elongated members extending substantially in the same direction, and said upper elongated members being adapted to be laterally spaced apart a distance less than the hull width of a water craft and to be extended lengthwise at least a portion of the hull length;

means associated with lower ends of the end stands suited to rest on a generally horizontal support surface operable to hold the frame structure with the end stands substantially disposed vertically and with said upper elongated members substantially disposed horizontally;

said pair of upper elongated members being spaced apart horizontally and being vertically higher than the end stands at all locations laterally between the upper elongated members; and said end stands having a height suited with said lower end means adapted to be rested on a river or lake bed support surface to locate the upper elongated members proximate but generally below the water surface, operable to allow said water craft to be substantially floated with clearance over the end stands and lengthwise between and onto the upper elongated members and into a supported or docked association therewith.

2. A portable docking/support system for personal water craft according to claim 1, further comprising the frame structure end stands and elongated members being formed as respective subassemblies, and the connection between the end stands and elongated members being by releasible connecting means suited to allow assembly of these subassemblies for system use and disassembly of these subassemblies for nonuse shipment or storage.

3. A portable docking/support system for personal water craft according to claim 1, further comprising the frame structure being formed of plastic piping components adapted to have a total weight of between 25–50 pounds to enable the frame structure to be manually moved and be durable in and out of water.

4. A portable docking/support system for personal water craft according to claim 3, further comprising the frame structure end stands and elongated members being formed as respective subassemblies, and the connection between the end stands and elongated members being by separable unions each having cooperating threaded male and female components secured relative to the respective stands and members, suited to allow assembly of these subassemblies for use and disassembly of these subassemblies for nonuse shipment or storage.

5. A portable docking/support system for personal water craft according to claim 1, further comprising the means associated with the lower ends of the end stand subassemblies including one or more alternatives consisting of: casters suited to be rolled on hard support surfaces, and/or all-terrain wheels suited to be rolled over soft or sandy terrain and directly into the water for launching the craft into the water, and/or closure plugs that can replace the casters to allow direct frame structure placement on any support surface.

6. A portable docking/support system for personal water craft according to claim 1, further comprising the frame structure being formed of plastic tees, elbows, pipes, nipples, and separable union components bonded permanently together to form end stand and elongated member subassemblies, which subassemblies via the separable union components can be assembled for use and disassembled for nonuse shipment or storage.

7. A portable docking/support system for personal water craft according to claim 6, further comprising the means associated with the lower ends of the end stand subassemblies including one or more alternatives consisting of: casters suited to be rolled on hard support surfaces, and/or all-terrain wheels suited to be rolled over soft or sandy terrain and directly into the water for launching the craft into the water, and/or closure plugs that can replace the casters to allow direct frame structure placement on any support surface.

8. A portable docking/support system for personal water craft according to claim 7, further comprising the frame structure upper elongated members adapted to be laterally spaced apart between 15–25 inches and to have lengths between 40–60 inches, and the frame structure end stands adapted to have heights between 10–30 inches.

9. A portable docking/support system for personal water craft according to claim 7, further comprising each upper elongated member subassembly including a one piece pipe with right-angle elbows bonded permanently in place on each pipe end, and one component of a separable union being bonded permanently in place via a pipe relative to the elbow, and the lower elongated member subassembly including the single piece pipe with a separable union being bonded permanently in place relative to each end of the pipe; and the upper elongated member subassemblies further being covered with a durable high density foam to provide cushioned free-sliding support of the water craft hull relative to the upper elongated member assemblies when being floated into the docked association therewith.

10. A portable docking/support system for personal water crafts, the system comprising, frame structure including end stands and elongated members connected at opposite ends thereof to upper ends of the end stands, the frame structure being formed of plastic piping components adapted to be durable in and out of water, and having a total weight of between 25–50 pounds to enable the frame structure to be manually lifted and carried;

means associated with lower ends of the end stands suited to rest on a generally horizontal support surface with the end stands substantially disposed vertically and with said elongated members substantially disposed horizontally;

said elongated members including a pair of upper members and a lower member spaced below and laterally between the upper members for triangularly strengthening the frame structure, each of said elongated members extending substantially in the same direction;

said end stands having a height to provide that with said lower end means rested on a river or lake bed support surface the upper elongated members will be adapted to be proximate the water surface and the upper elongated members will be adapted to be laterally spaced apart a distance less than the hull width of the water craft and extended lengthwise a portion of the hull length so that the water craft can be substantially floated lengthwise onto the upper elongated members and into a supported or docked association with the portable docking/support system; and the frame structure end stands and elongated members being formed as respective subassemblies, the connection between the end stands and elongated members being by separable unions each having cooperating threaded male/female components secured relative to the respective stands and members, suited to allow assembly of these subassemblies for system use and disassembly of these subassemblies for nonuse shipment or storage.

11. A portable docking/support system for personal water crafts, the combination comprising, frame structure including end stands adapted to be spaced apart in the longitudinal direction of the water craft and elongated members connected at opposite ends thereof to upper ends of the end stands adapted to be extended in the longitudinal direction of the water craft;

means associated with lower ends of the end stands suited to rest on a generally horizontal support surface with the end stands substantially disposed vertically and with said elongated members substantially disposed horizontally;

said elongated members including a pair of upper members and a lower member spaced below and laterally between the upper members for triangularly strengthening the frame structure, each of said elongated members extending substantially in the same direction;

the upper elongated members adapted to be laterally spaced apart a distance less than the hull width of a water craft and to be extended lengthwise a portion of the hull length;

said end stands having a height suited with said lower end means rested on a river or lake bed support surface to locate the upper elongated members proximate the water surface so as to allow the water craft to be floated and manipulated lengthwise onto the upper elongated members and into a supported or docked association therewith;

the frame structure being formed of plastic tees, elbows, pipes, nipples, and separable union components appropriately bonded permanently together to form end stand and elongated member subassemblies, whereby the subassemblies can be assemblied for system use and disassembled for nonuse shipment or storage;

the means associated with the end stand lower ends including one or more alternatives consisting of: casters suited to be rolled on hard support surfaces, and/or all-terrain wheels suited to be rolled over soft or sandy terrain and directly into the water for launching the craft into the water, and/or closure plugs that can replace the casters to allow direct frame structure placement on any support surface; and each upper elongated subassembly including a one piece pipe with right-angle elbows bonded permanently in place on each pipe end, and one component of a separable union being bonded permanently in place via a pipe relative to the elbow, and the lower elongated subassembly including the single piece pipe with a component of a separable union being bonded permanently in place relative to each end of the pipe; and the upper elongated subassemblies further being covered with a durable high density foam to provide cushioned free-sliding support of the craft hull relative to the elongated longitudinal members.

* * * * *